(12) United States Patent
Guo

(10) Patent No.: US 9,327,370 B2
(45) Date of Patent: May 3, 2016

(54) ASSEMBLY MECHANISM

(71) Applicants:Fu Tai Hua Industry (Shenzhen) Co., Ltd., Shenzhen (CN); HON HAI PRECISION INDUSTRY CO., LTD., New Taipei (TW)

(72) Inventor: Kai-Min Guo, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 317 days.

(21) Appl. No.: 14/138,215

(22) Filed: Dec. 23, 2013

(65) Prior Publication Data

US 2014/0182121 A1    Jul. 3, 2014

(30) Foreign Application Priority Data

Dec. 29, 2012   (CN) .......................... 2012 1 0588136

(51) Int. Cl.
*B23P 19/04*    (2006.01)
(52) U.S. Cl.
CPC ............ *B23P 19/04* (2013.01); *Y10T 29/53061* (2015.01); *Y10T 29/53987* (2015.01)
(58) Field of Classification Search
CPC .............. B23P 19/04; Y10T 29/53987; Y10T 29/53061
See application file for complete search history.

(56) References Cited

U.S. PATENT DOCUMENTS

| 8,061,018 B2 * | 11/2011 | Stepanek ................ G01F 23/00 269/289 R |
| 8,875,388 B1 * | 11/2014 | Daw ........................ B23P 19/04 29/715 |
| 9,151,513 B1 * | 10/2015 | Daw ........................ B23P 19/04 |

FOREIGN PATENT DOCUMENTS

| CN | 101673629 A | 3/2010 |
| CN | 201979271 U | 9/2011 |

* cited by examiner

*Primary Examiner* — Richard Chang
(74) *Attorney, Agent, or Firm* — Novak Druce Connolly Bove + Quigg LLP

(57) ABSTRACT

An assembly mechanism for assembling an annular workpiece to a fixture, includes a base seat, a fetching assembly, a guiding assembly, and a releasing assembly. The base seat defines a feeding hole and an uploading groove. The fetching assembly includes a first driving member and fetching subassembly. The fetching subassembly includes a sliding member and a fetching member, the handing member defines a fetching hole. The guiding assembly includes a guiding rod. The releasing assembly latches with the handing member. Wherein the first driving member drives the sliding member to slide from the uploading groove to the feeding hole, thereby fetching the workpiece from the uploading groove to the feeding hole, the guiding rod extends into the workpiece to position it, the releasing assembly releases the workpiece, then the workpiece is blown away from the guiding rod and is positioned on a top of the fixture.

20 Claims, 4 Drawing Sheets

ASSEMBLY MECHANISM

BACKGROUND

1. Technical Field

The present disclosure relates to assembly mechanisms, and more particularly, to an assembly mechanism for assembling an annular workpiece to a fixture.

2. Description of Related Art

An assembly mechanism is employed to assemble a tiny annular workpiece to a fixture. The assembly mechanism includes a fetching assembly to clamp and handle the workpiece to a top of the fixture. Due to the tiny size of the workpiece, it is not easy for the fetching assembly to clamp and align the workpiece to the fixture. So, the workpiece may be dropped from the fixture, thereby reducing an efficiency of assembling of the annular workpiece to the fixture.

Therefore, there is room for improvement in the art.

BRIEF DESCRIPTION OF THE DRAWINGS

The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

Figure 1:
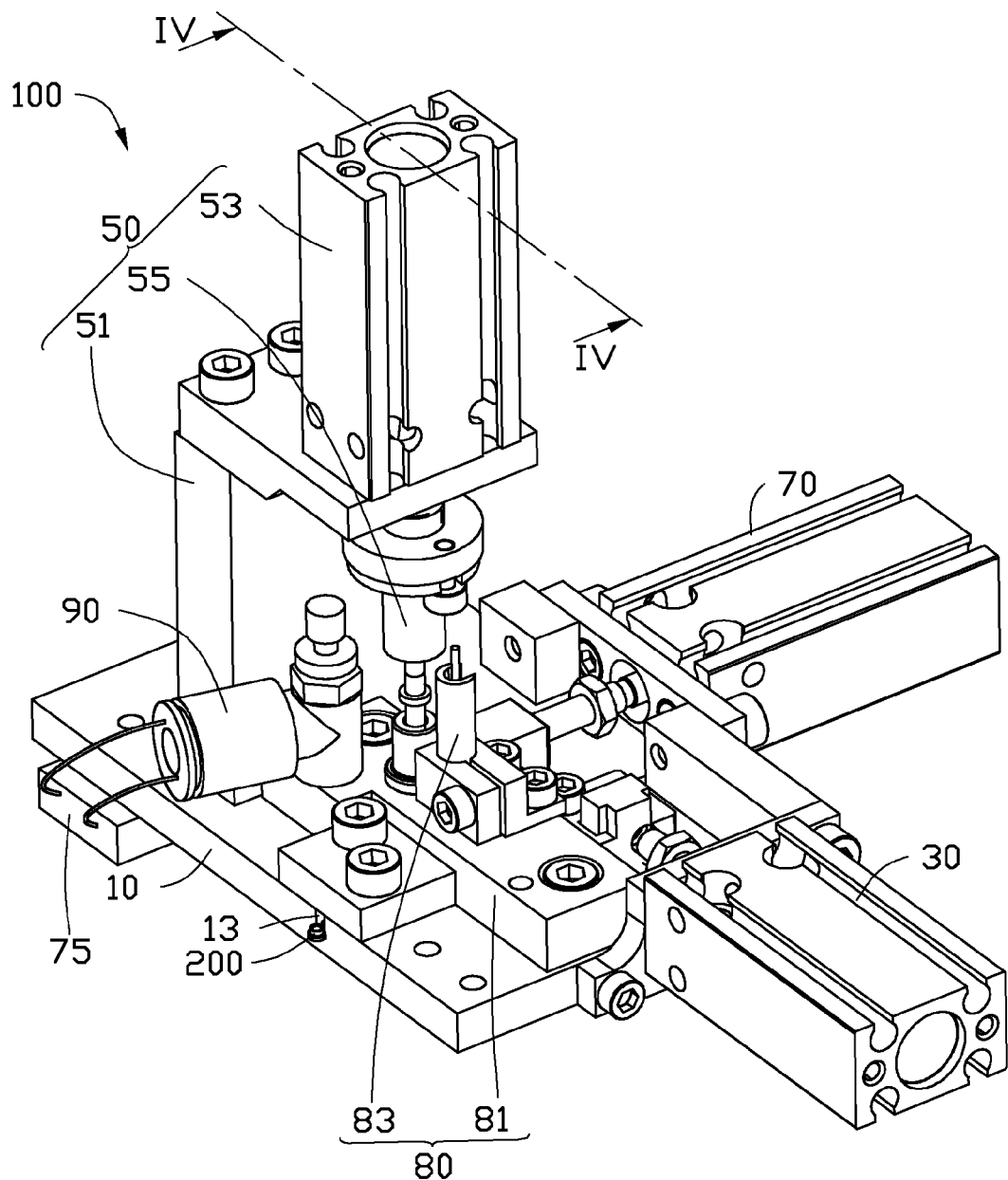
FIG. 1 is an isometric view of an embodiment of an assembly mechanism in an usage state, and the assembly mechanism includes a base seat, a fetching assembly, and a releasing assembly.

FIG. 1 shows an embodiment of an assembly mechanism 100 employed to assembly an annular workpiece 200 to a fixture (not shown). In the embodiment, the fixture is arranged below the assembly mechanism 100. The assembly mechanism 100 includes a base seat 10, a fetching assembly 30, a guiding assembly 50, and a releasing assembly 70. The fetching assembly 30, the guiding assembly 50, and the releasing assembly 70 are assembled to the base seat 10, respectively. The fetching assembly 30 moves the workpiece 200 to the guiding assembly 50. The guiding assembly 50 extends towards the workpiece 200 and resists the fixture to align the workpiece 200 to a top of the fixture. The releasing assembly 70 drags the fetching assembly 30 to release the workpiece 200, and then the workpiece 200 is dropped onto and assembled to the fixture.

Figure 2:
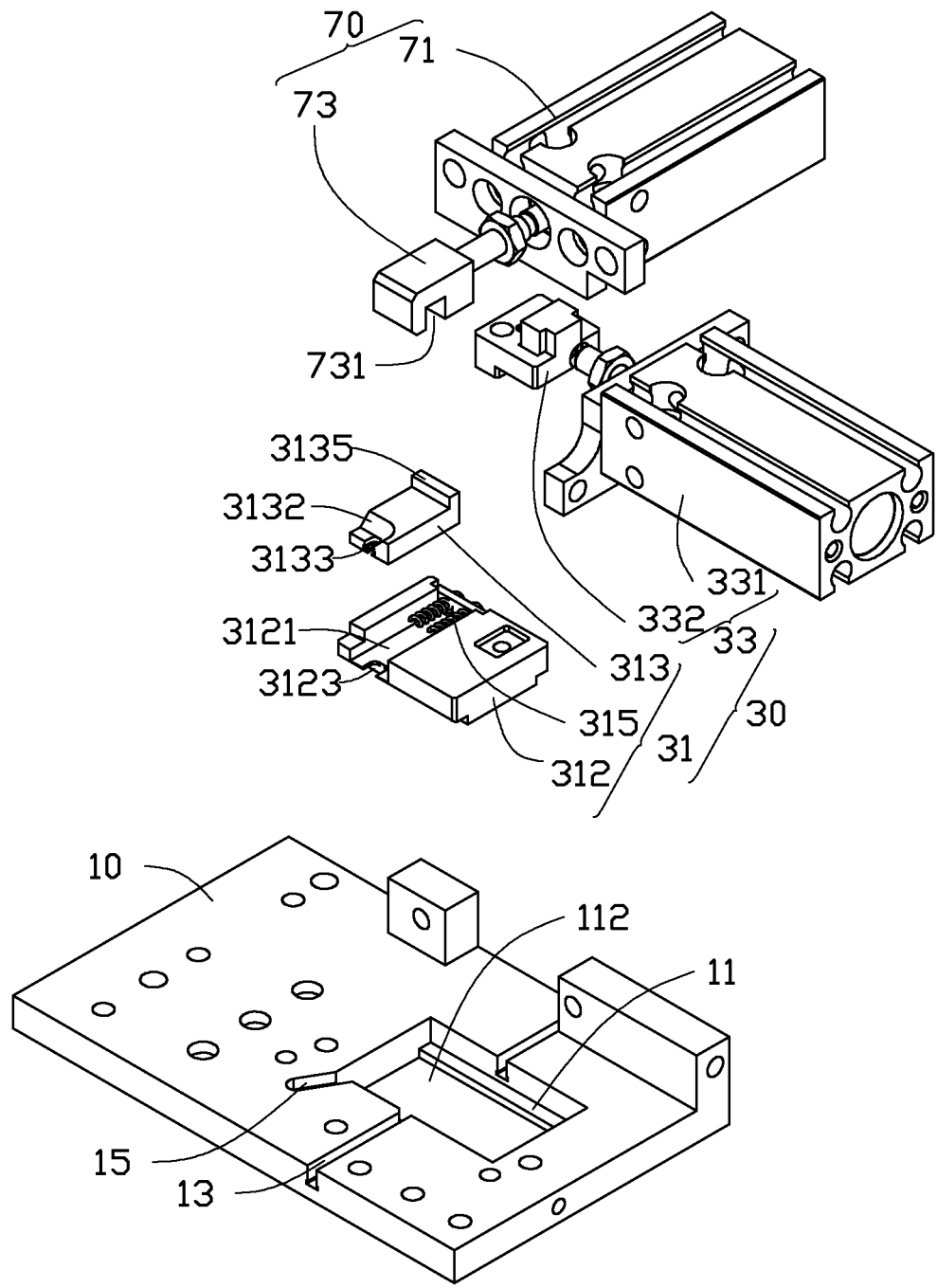
FIG. 2 is an exploded, isometric view of the base seat, the fetching assembly, and the releasing assembly of the assembly mechanism of FIG. 1.

FIG. 2 shows that the base seat 10 is substantially in a rectangular plate shape, and defines a receiving groove 11, a through hole 112, a feeding hole 113 (see FIG. 4), an uploading groove 13, and an air groove 15 thereon. The receiving groove 11 is substantially in a rectangular shape and defined in a middle of the base seat 10. The through hole 112 is defined on a bottom of the receiving groove 11 and cuts through a bottom of the base seat 10. The feeding hole 113 is defined on an edge of the through hole 112 and aligned to the guiding assembly 50. The uploading groove 13 is defined on a side wall of the receiving groove 11, and extends toward an outside wall of the base seat 10. The uploading groove 13 cuts through the sidewall of the receiving groove 11, the outside wall and a top of the base seat 10. The workpiece 200 is received and arranged in the uploading groove 13. The air groove 15 extends from a corner of the receiving groove 11 toward outside of the base seat 10, and communicates with the receiving groove 11. The extending directions of the air groove 15 and the uploading groove 13 define an acute angle, and are perpendicular to an extending direction of the feeding hole 113. The feeding hole 113 is located between the uploading groove 13 and the air groove 15. In the embodiment, a pushing rod (not shown) is employed to push the workpiece 200 in the uploading groove 13 toward the receiving groove 11 one by one.

Figure 3:
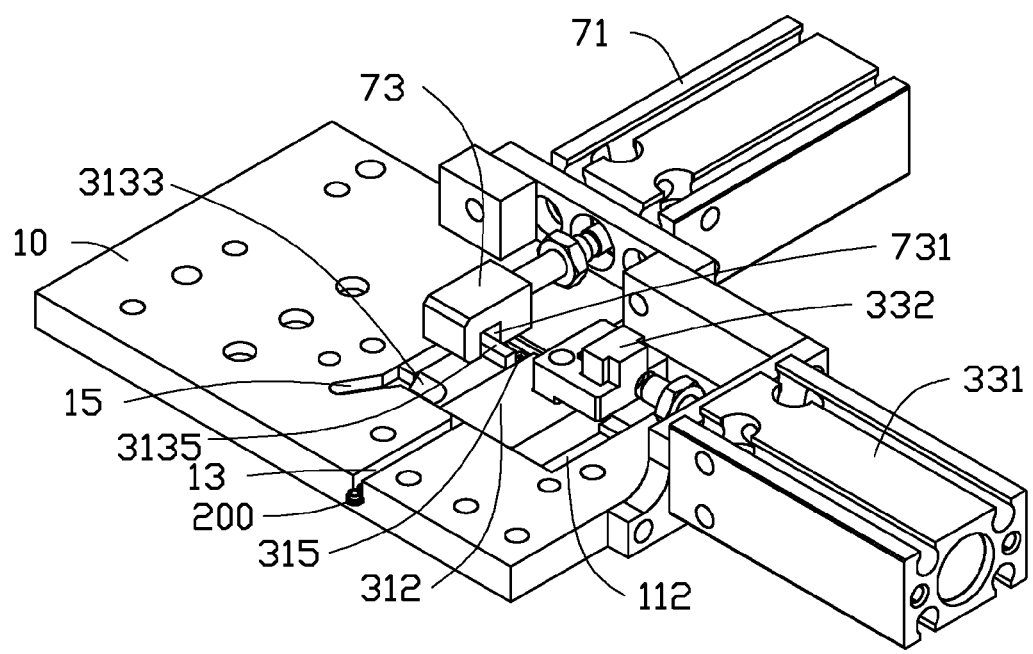
FIG. 3 is an assembled, isometric view of the base seat, the fetching assembly, and the releasing assembly of the assembly mechanism.

FIG. 3 shows that the fetching assembly 30 is assembled to the base seat 10 adjacent to the receiving groove 11. The fetching assembly 30 includes a fetching subassembly 31 and a first driving member 33 connected to the fetching subassembly 31. The fetching subassembly 31 is slidably assembled to the bottom of the receiving groove 11 and positioned above of the through hole 112. The fetching subassembly 31 includes a sliding member 312, a fetching member 313, and a pair of first elastic members 315. The sliding member 312 is slidably mounted on the bottom of the receiving groove 11 and positioned above of the through hole 112. The sliding member 312 recesses from a top thereof to define a receiving portion 3121. The receiving portion 3121 extends toward the uploading groove 13 and cuts through a side surface of the sliding member 312. The receiving portion 3121 communicates with the uploading groove 13, and defines an inserting hole 3123 at an end thereof.

The fetching member 313 is slidably received in the receiving portion 3121 of the sliding member 312, and defines a fetching groove 3132 corresponding to the inserting hole 3123 of the receiving portion 3121 and a fetching hole 3133 at a bottom of the fetching groove 3132. The fetching hole 3133 is aligned to the inserting hole 3123 to allow the workpiece 200 to move from the uploading groove 13, and enter into the fetching groove 3132 and partially received in the fetching hole 3133. The fetching member 313 further includes a latching portion 3135 at a side thereof away from the fetching groove 3132. The pair of first elastic members 35 is received in the receiving portion 3121; opposite ends of each first elastic member 35 are resisted by the latching portion 3135 of the fetching member 313 and the sliding member 312. The first driving member 33 includes a driving body 331 and an output shaft 332 connected to the driving body 331. The driving body 331 is assembled to the base seat 10 and is adjacent to the through hole 112. The output shaft 332 is located above the through hole 112 and connected to a side of the sliding member 312. The axis of the output shaft 332 is perpendicular to a sliding direction of the sliding member 312. The first driving member 33 is configured for moving the fetching subassembly 31 from the uploading groove 13 to the feeding hole 113, thereby enabling the workpiece 200 to move from the uploading groove 13 to the feeding hole 113 and be aligned to the feeding hole 113.

Figure 4:
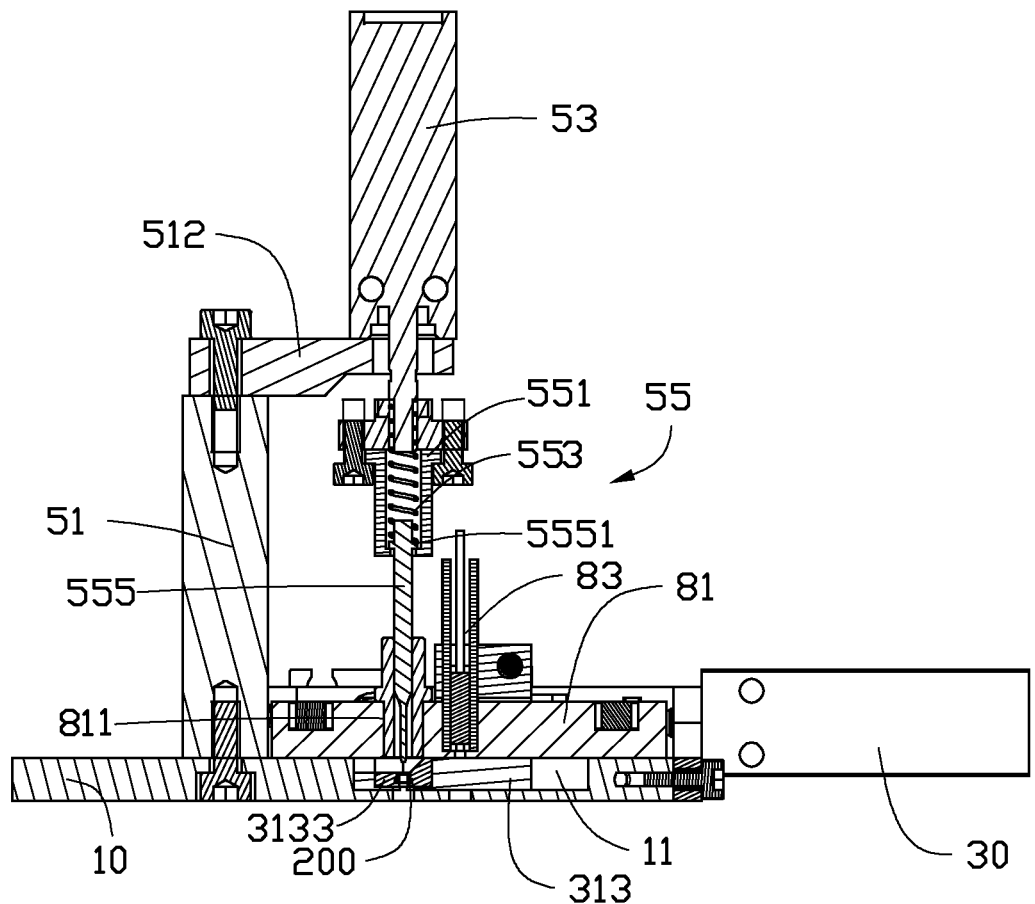
FIG. 4 is a cross-sectional view of the assembly mechanism of FIG. 1, taken along line IV-IV.

FIG. 4 shows that the guiding assembly 50 is assembled to the base seat 10 and is adjacent to the through hole 112. The guiding assembly 50 includes a supporting bracket 51, a second driving member 53, and a guiding subassembly 55.

The supporting bracket 51 is assembled to the base seat 10, and located at a side of the through hole 112 opposite to the fetching assembly 30. The supporting bracket 51 includes a mounting portion 512 located above the through hole 112. The mounting portion 512 extends parallel to the base seat 10. The second driving member 53 is assembled to the mounting portion 512 and aligned to the through hole 112. The guiding subassembly 55 is assembled to the second driving member 53, and includes a sleeve 551, a second elastic member 553 and a guiding rod 555. The sleeve 551 is assembled to the second driving member 53. The second elastic member 553 is received in the sleeve 551. The guiding rod 555 includes a resisting portion 5551 at an end thereof received in the sleeve 551. The resisting portion 5551 is an annular rib surrounding a periphery of the guiding rod 555. A diameter of the resisting portion 5551 is less than that of the inner diameter of the sleeve 551. Opposite ends of the resisting portion 5551 resist the sleeve 551 and the second elastic member 553. The second driving member 53 is configured for driving the guiding rod 555 to extend through the workpiece 200 and pass through the fetching hole 3133 of the fetching member 313, the inserting hole 3123 of the sliding member 312 and the feeding hole 113 of the base seat 10, until the guiding rod 555 resists the top of the fixture, to guide the workpiece 200 to the fixture.

The releasing assembly 70 is assembled to the base seat 10 and latches with the fetching assembly 30. The releasing assembly 70 includes a third driving member 71 and a latching member 73 connected to the third driving member 71. The third driving member 71 is assembled to the base seat 10 and is adjacent to the through hole 112, and is arranged perpendicular to the first driving member 33. The latching member 73 latches with the latching portion 3135 of the fetching member 313. The latching member 73 is substantially a rectangular block and defines a latching groove 731. The latching portion 3135 of the fetching member 313 is partially received in the latching groove 731. The third driving member 71 is configured for dragging the fetching member 313 away from the feeding hole 113 to release the workpiece 200.

FIG. 1 shows that the assembly mechanism 100 further includes a controller 75, a sensing member 80 and an adjusting valve 90. The controller 75 is assembled to the base seat 10 and is electrically connected to the driving body 331 of the first driving member 33, the second driving member 53, the third driving member 71, the sensing member 80 and the adjusting valve 90. The sensing member 80 is assembled to a top of the base seat 10 and located above the uploading groove 13. The sensing member 80 includes a pressing plate 81 and a sensing portion 83 assembled to a top portion of the pressing plate 81. The pressing plate 81 is located above the uploading groove 13, the air groove 15, and the receiving groove 11, and defines a guiding hole 811 (see FIG. 4) corresponding to the guiding rod 555. The guiding hole 811 communicates with the feeding hole 113, and is located above the workpiece 200, for the guiding rod 555 to extend therethrough. The sensing portion 83 is aligned to an end of the uploading groove 13 which is adjacent to the through hole 112, for sensing if there are workpieces 200 found in the uploading groove 13 and transmitting a signal to the controller 75. The adjusting valve 90 is assembled to the pressing plate 81 and is adjacent to the air groove 15, and communicates with the air groove 15, for introducing high pressured air flow into the air groove 15. The high pressured air flows to the guiding rod 555 and blows the workpiece 200 away from the guiding rod 555 toward the fixture.

When in assembly, the sliding member 312 is slidably mounted on the bottom of the receiving groove 11 and arranged above the through hole 112. The fetching member 313 is slidably received in the receiving portion 3121 of the sliding member 312. The pair of first elastic members 315 is received in the receiving portion 3121 and resisted between the latching portion 3135 of the fetching member 313 and the sliding member 312. The first driving member 33 is assembled to the base seat 10 and connected to the sliding member 312. The supporting bracket 51 is assembled to the base seat 10; the second driving member 53 is assembled to the mounting portion 512. The sleeve 551 is assembled to the second driving member 53. The second elastic member 553 is received in the sleeve 551. An end of the guiding rod 555 is received in the sleeve 551 and resists the second elastic member 553. The other end of the guiding rod 555 is aligned to the feeding hole 113. The third driving member 71 is assembled to the base seat 10 and arranged perpendicular to the first driving member 33. The latching member 73 is connected to the third driving member 71. The latching groove 731 of the latching member 73 latches with the latching portion 3135 of the fetching member 313. The pressing plate 81 is assembled to the base seat 10 and is located above the uploading groove 13. The sensing portion 83 is aligned to an end of the uploading groove 13 adjacent to the through hole 112. The adjusting valve 90 is assembled to the pressing plate 81 above the air groove 15 and connected to an outer air source. The controller 75 is assembled to the base seat 10 and electrically connected to the driving body 331 of the first driving member 33, the second driving member 53, the third driving member 71, the sensing member 80 and the adjusting valve 90.

When in use, the sensing portion 83 senses a workpiece 200 in the uploading groove 13 and sends signal to the controller 75. The controller 75 controls the first driving member 33 to move the fetching member 313 relative to the base seat 10, thereby aligning the fetching hole 3133 to the uploading groove 13. Then the workpiece 200 is pushed by the pushing rod and is partially received in the fetching hole 3133. The first driving member 33 pushes the fetching member 313 to the feeding hole 113 to enable the fetching member 313 to be aligned to the guiding rod 555, thereby aligning the workpiece 200 to the feeding hole 113. The second driving member 53 drives the guiding rod 555 to extend through the workpiece 200, the inserting hole 3123 of the sliding member 312, and the feeding hole 113 of the base seat 10. The guiding rod 555 resists the top of the fixture and aligns the workpiece 200 to the fixture. The third driving member 71 drives the fetching member 313 away from the feeding hole 113 via the latching member 73. The fetching member 313 compresses the first elastic member 315 and releases the workpiece 200. The adjusting valve 90 allows the high pressure air to flow into the air groove 15. The high pressure air is guided to the feeding hole 113, and blows the workpiece 200 away from the guiding rod 555 to the top of the fixture.

The workpiece 200 is moved by the fetching member 313 from the uploading groove 13 to the feeding hole 113, and dropped to the fixture by the guiding rod 555, thereby a direct clamping by the fetching member 313 is omitted, therefore, the workpiece 200 is easy to be clamped. The third driving member 71 drags the fetching member 313 to release the workpiece 200, and the guiding rod 555 guides the workpiece 200 to the fixture, thereby enhancing a positioning accuracy and an assembling efficiency of the assembly mechanism 100.

When the first driving member 33, the second driving member 53, and the third driving member 71 acts in a predetermined order, the controller 75 and the adjusting valve 90 may be omitted. When the workpiece 200 is aligned to the feeding hole 113 by the fetching member 313 alone, the guiding assembly 50 may be omitted.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. An assembly mechanism for assembling an annular workpiece to a fixture, comprising:
   a base seat defining a receiving groove, a feeding hole and an uploading groove, the feeding hole being defined at an edge of the receiving groove, the uploading groove cutting though a sidewall of the receiving groove and an outer sidewall of the base seat;
   a fetching assembly comprising a first driving member and a fetching subassembly connected to the first driving member, the first driving member being assembled to the base seat, the fetching subassembly being slidably received in the receiving groove, the fetching subassembly comprising a sliding member and a fetching member slidably received in the sliding member, the fetching member defining a fetching hole corresponding to the uploading groove for receiving the workpiece;
   a guiding assembly comprising a guiding rod slidably mounted on the base seat and aligned to the feeding hole; and
   a releasing assembly assembled to the base seat and latching with the fetching member; wherein the first driving member drives the sliding member to slide from the uploading groove to the feeding hole, thereby fetching the workpiece from the uploading groove to the feeding hole by the fetching member, the guiding rod extends into the workpiece to position the workpiece, the releasing assembly drags the fetching member to slide relative to the sliding member along a direction perpendicular to a sliding direction of the sliding member to release the workpiece, and the workpiece is blew away from the guiding rod and positioned on a top of the fixture.

2. The assembly mechanism of claim 1, wherein the base seat further defines a through hole on a bottom of the receiving groove, the feeding hole is adjacent to the through hole and aligned to the guiding rod, the guiding assembly further comprises a second driving member connected to the base seat, the guiding rod is assembled to the second driving member.

3. The assembly mechanism of claim 1, wherein the fetching subassembly further comprises at least one first elastic member, the sliding member is slidably received in the receiving groove, the at least one first elastic member is received in the sliding member and resisted between the sliding member and the fetching member, thereby driving the fetching member to resist a sidewall of the receiving groove.

4. The assembly mechanism of claim 1, wherein the first driving member comprises a driving body and an output shaft connected to the driving body, the driving body is assembled to the base seat adjacent to the receiving groove, the output shaft is connected to the sliding member.

5. The assembly mechanism of claim 3, wherein the sliding member recesses from a top thereof to form a receiving portion and defines an inserting hole on a side of the receiving portion adjacent to the uploading groove, the fetching member is received in the receiving portion and defines a fetching groove corresponding to the inserting hole, the fetching hole is defined on a bottom of the fetching groove.

6. The assembly mechanism of claim 5, wherein the fetching member comprises a latching portion at an end away from the fetching groove, the at least one first elastic member is resisted between the latching portion and the sliding member, the guiding rod is configured for extending into the workpiece, the fetching hole, the inserting hole and the feeding hole.

7. The assembly mechanism of claim 1, wherein the guiding assembly further comprises a supporting bracket assembled to the base seat and a second driving member connected to the supporting bracket, the guiding rod is connected to the second driving member.

8. The assembly mechanism of claim 7, wherein the supporting bracket is located at a side of the receiving groove opposite to the fetching assembly, the supporting bracket comprises a mounting portion located above the receiving groove and extending parallel to the base seat, the second driving member is assembled to the mounting portion and aligned to the feeding hole.

9. The assembly mechanism of claim 7, wherein the guiding assembly further comprises a guiding subassembly comprising a sleeve, a second elastic member and the guiding rod, the sleeve is assembled to the second driving member, the guiding rod comprises a resisting portion at an end thereof received in the sleeve, the second elastic member is received in the sleeve and resists the resisting portion.

10. The assembly mechanism of claim 6, wherein the releasing assembly comprises a third driving member and a latching member connected to the third driving member, the third driving member is assembled to the base seat and is adjacent to the receiving groove, the latching member defines a latching groove latching with the latching portion of the fetching member, the third driving member is configured for dragging the fetching member away from the feeding hole to release the workpiece along the direction perpendicular to the sliding direction of the sliding member.

11. The assembly mechanism of claim 1, further comprising a sensing member assembled to a top of the base seat, wherein the sensing member comprises a pressing plate and a sensing portion assembled to a top of the pressing plate, the pressing plate is located above the receiving groove, the uploading groove and the feeding hole, and defines a guiding hole corresponding to the guiding rod, the guiding hole communicates with the feeding hole, for the guiding rod extending therethrough, the sensing portion is aligned to an end of the uploading groove adjacent to the receiving groove, for sensing if there are workpieces in the uploading groove, and then the first driving member drives the sliding member to slide.

12. The assembly mechanism of claim 11, wherein the base seat further defines an air groove extending from a corner of the receiving groove toward outside of the base seat, the air groove communicates with the receiving groove, extending directions of the air groove and the uploading groove define an acute angle, the feeding hole is located between the uploading groove and the air groove, the assembly mechanism further comprises an adjusting valve assembled to the pressing plate and communicating with the air groove, for introducing air into the air groove, the air flows to the guiding rod and blows the workpiece away from the guiding rod toward the feeding hole.

13. An assembly mechanism for assembling an annular workpiece to a fixture, comprising:
   a base seat defining a receiving groove, an uploading groove, an air groove, and a feeding hole, the uploading groove cutting though a side of the receiving grove and an outer sidewall of the base seat, the air groove extending from a corner of the receiving groove toward outside of the base seat and communicating with the receiving groove, the feeding hole being defined at an edge of the receiving groove and located between the air groove and the uploading groove;

a fetching assembly comprising a first driving member and fetching subassembly connected to the first driving member, the first driving member being assembled to the base seat, the fetching subassembly being slidably received in the receiving groove, the fetching subassembly comprising a sliding member and a fetching member slidably received in the sliding member, the fetching member is aligned to the uploading groove;

a guiding assembly slidably mounted on the base seat and aligned to the feeding hole; and a releasing assembly assembled to the base seat and latching with the fetching member; wherein the first driving member drives the sliding member to slide from the uploading groove to the feeding hole, thereby fetching the workpiece from the uploading groove to the feeding hole by the fetching member, the guiding assembly extends into the workpiece to position the workpiece, the releasing assembly drags the fetching member to slide relative to the sliding member along a direction perpendicular to a sliding direction of the sliding member to release the workpiece, then the workpiece is blew by air introduced form the air groove to move away from the guiding rod, and is positioned on a top of the fixture.

14. The assembly mechanism of claim 13, wherein the base seat further defines a through hole on a bottom of the receiving groove, the feeding hole is adjacent to the through hole and aligned to the guiding rod, the guiding assembly comprises a second driving member connected to the base seat and a guiding subassembly connected to the second driving member, the guiding subassembly is driven by the second driving member to the workpiece.

15. The assembly mechanism of claim 13, wherein the fetching subassembly further comprises at least one first elastic member, the sliding member is slidably received in the receiving groove, the at least one first elastic member is received in the sliding member and resisted between the sliding member and the fetching member, thereby driving the fetching member to resist a sidewall of the receiving groove.

16. The assembly mechanism of claim 15, wherein the sliding member recesses from a top thereof to form a receiving portion and defines an inserting hole on a side of the receiving portion adjacent to the uploading groove, the fetching member is received in the receiving portion and defines a fetching groove corresponding to the inserting hole, and a fetching hole on a bottom of the fetching groove, the fetching hole is aligned to the uploading groove for partially receiving the workpiece.

17. The assembly mechanism of claim 16, wherein the fetching member comprises a latching portion at an end away from the fetching groove, the at least one first elastic member is resisted between the latching portion and the sliding member, the guiding assembly is configured for extending into the workpiece, the fetching hole, the inserting hole and the feeding hole.

18. The assembly mechanism of claim 14, wherein the guiding subassembly comprises a sleeve, a second elastic member and a guiding rod, the sleeve is assembled to the second driving member, the guiding rod comprises a resisting portion at an end thereof received in the sleeve, the second elastic member is received in the sleeve and resists the resisting portion, the guiding rod extends into the workpiece.

19. The assembly mechanism of claim 17, wherein the releasing assembly comprises a third driving member and a latching member connected to the third driving member, the third driving member is assembled to the base seat and is adjacent to the receiving groove, the latching member defines a latching groove latching with the latching portion of the fetching member, the third driving member is configured for dragging the fetching member away from the feeding hole to release the workpiece along the direction perpendicular to the sliding direction of the sliding member.

20. The assembly mechanism of claim 13, wherein extending directions of the air groove and the uploading groove define an acute angle, the assembly mechanism further comprises an adjusting valve assembled to the base seat and communicating with the air groove, for introducing air into the air groove, the air flows to the guiding rod and blows the workpiece away from the guiding rod toward the feeding hole.

* * * * *